Figure 3:
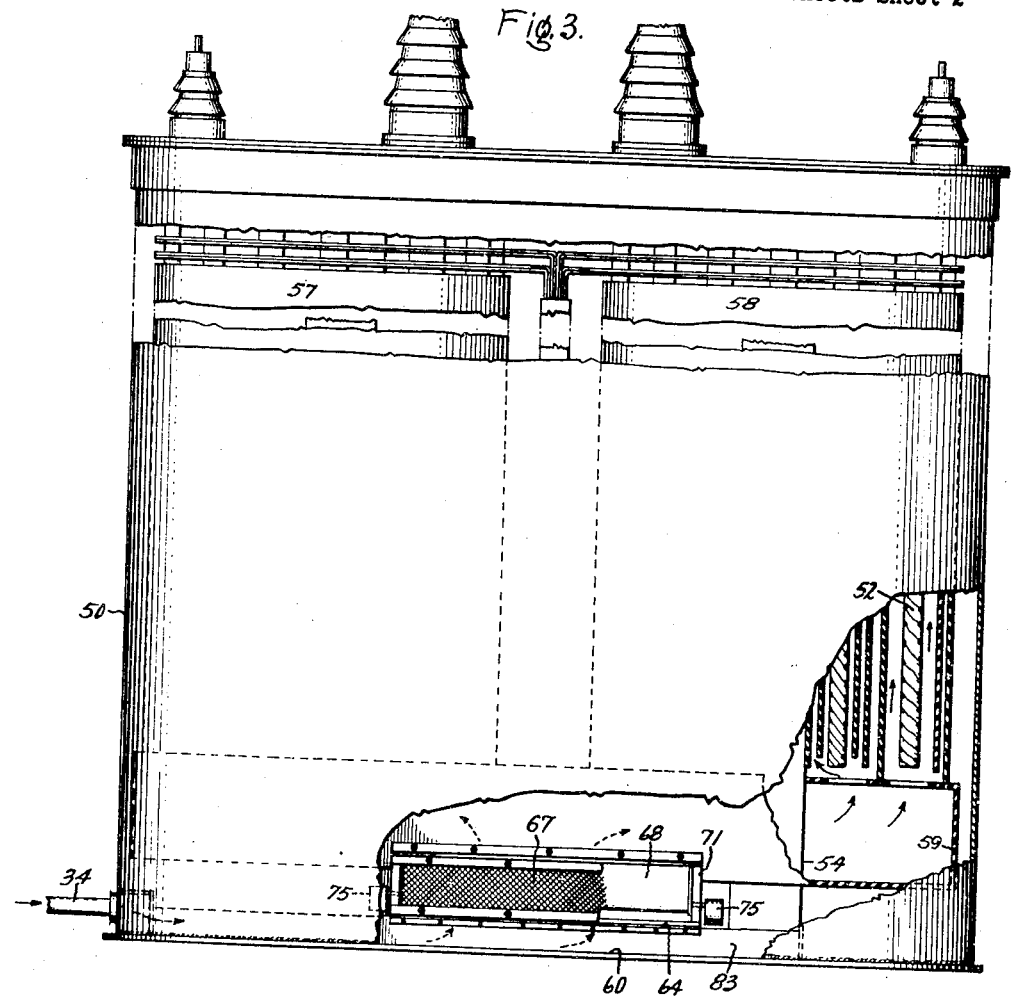

April 27, 1948.　　　　　K. K. PALUEV　　　　　2,440,556
ELECTRICAL APPARATUS
Filed March 8, 1944　　　　　4 Sheets-Sheet 1
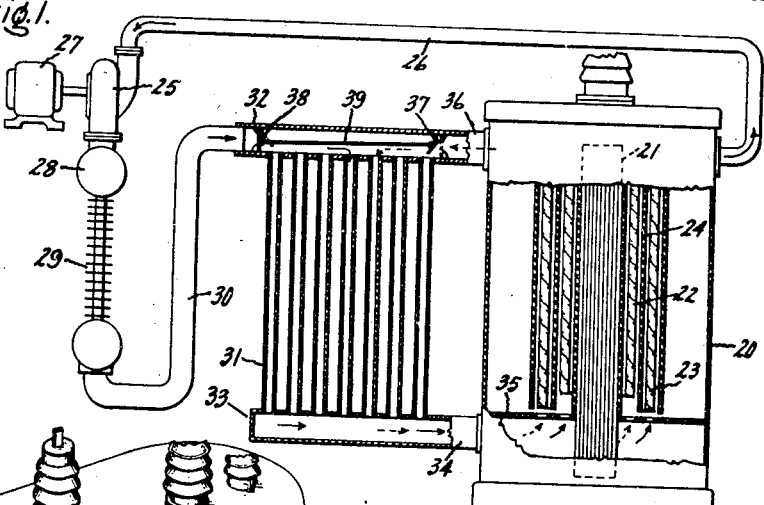
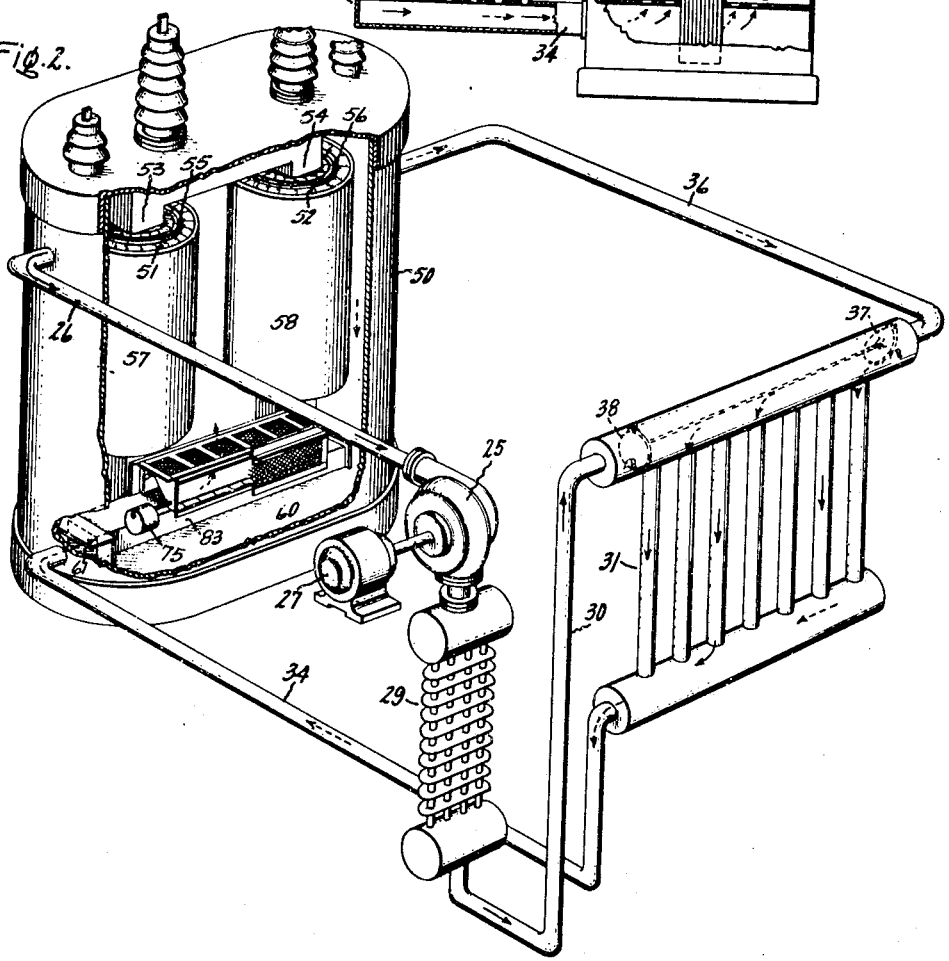
Inventor:
Konstantin K. Paluev,
by Harry E. Dunham
His Attorney.

April 27, 1948.  K. K. PALUEV  2,440,556
ELECTRICAL APPARATUS
Filed March 8, 1944  4 Sheets-Sheet 2

Inventor:
Konstantin K. Paluev,
by Harry E. Dunham
His Attorney.

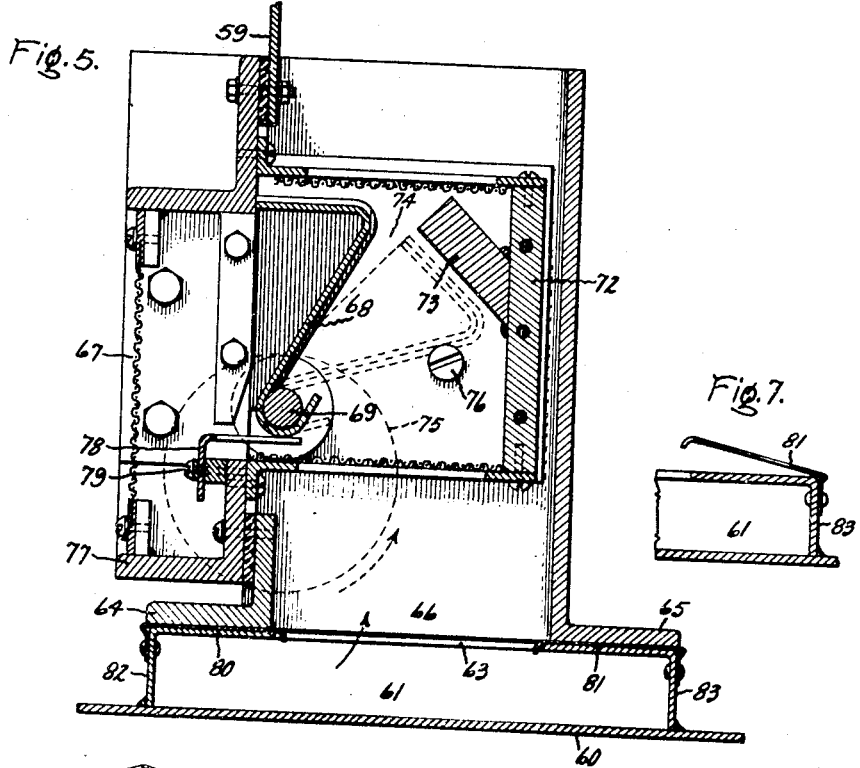
Fig. 5.
Fig. 7.
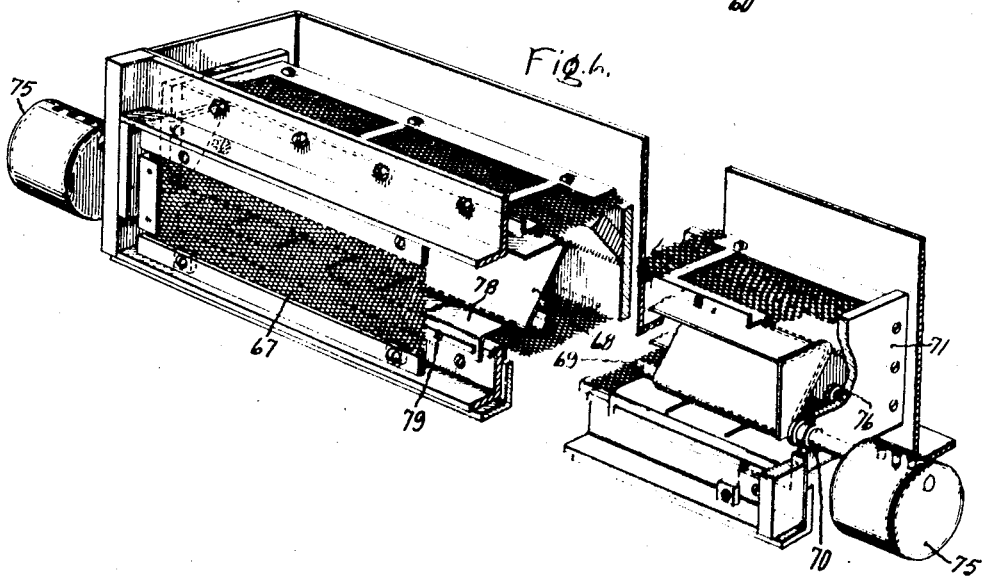
Fig. 6.
Inventor:
Konstantin K. Paluev,
by Harry E. Dunham
His Attorney.

April 27, 1948.　　　　K. K. PALUEV　　　　2,440,556
ELECTRICAL APPARATUS
Filed March 8, 1944　　　　4 Sheets-Sheet 4

Inventor:
Konstantin K. Paluev,
by Harry E. Dunlap
His Attorney.

Patented Apr. 27, 1948

2,440,556

UNITED STATES PATENT OFFICE 2,440,556

ELECTRICAL APPARATUS

Konstantin K. Paluev, Pittsfield, Mass., assignor to General Electric Company, a corporation of New York Application March 8, 1944, Serial No. 525,570

12 Claims. (Cl. 175—361)

My invention relates to electrical apparatus, to electrical induction apparatus and to a structure for facilitating the cooling thereof, and although not limited thereto it has particular application to transformers.

Electrical induction apparatus such as transformers have been made with windings having ducts therethrough in an enclosing casing with a cooling fluid therein and a heat exchanger arrangement or cooler connected to the casing so that the cooling fluid may recirculate through the winding ducts and cooler. It has been the common practice to allow the circulation to be accomplished by free convection or to provide a pump means for forcing the circulation so as to increase the amount of kva. capacity per unit of volume which can be obtained when only natural convection is depended upon to cause the circulation of the dielectric fluid.

When employing a forced cooled arrangement, transformers have also been manufactured with a barrier arrangement between the winding and the casing so as to direct the flow of the cooling fluid which enters the bottom of the casing from the heat exchanger up through the winding ducts rather than allowing circulation between the windings and the casing during the forced circulation. However, it has been appreciated that if the motor which operates the pump should fail, a maximum operating period of the transformer should be allowed without the forced cooling of the transformer. In order to make use of the thermal capacity of the relatively large body of fluid between the casing and the winding while the pump is not in operation, an opening has been placed in the barrier between the winding and the casing so as to allow free convection circulation of the dielectric fluid up through the winding duct and down between the winding and the casing and through the opening, when the pump is not in operation, and back into the lower end of the winding duct. A simple and efficient arrangement for accomplishing this includes the use of a valve or damper in the opening in the barrier, which damper keeps the opening closed during the forced cooled operation, and which damper automatically opens upon cessation of forced circulation of the cooling fluid, and this construction is described and claimed in my prior application Serial No. 443,310, filed May 16, 1942, now Patent No. 2,388,565, issued November 6, 1945, and assigned to the same assignee as this present invention.

It is an object of my invention to provide an improved structure for an electrical apparatus for facilitating the circulation of the insulating fluid through the apparatus.

Another object of my invention is to provide an electrical apparatus with an improved structure so as to improve the economy thereof and substantially decrease the size thereof over apparatus in previous constructions.

A further object of my invention is to provide a winding structure with a duct system and with an improved arrangement for allowing circulation of the dielectric fluid both by forced circulation and by circulation due to free convection.

Further objects and advantages of my invention will become apparent from the following description referring to the accompanying drawing, and the features of novelty which characterize my invention will be pointed out with particularity in the claims annexed to and forming a part of this specification.

Figure 4:
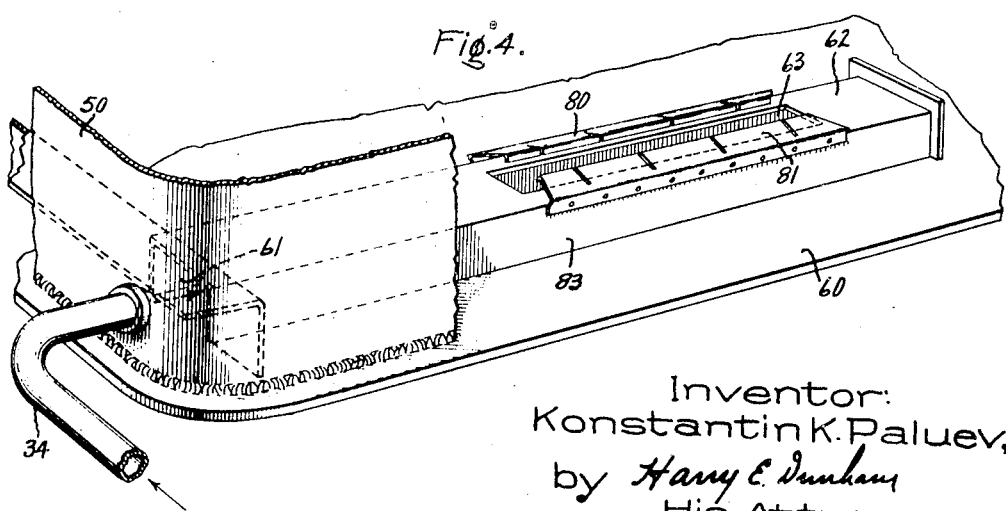
Figure 8:
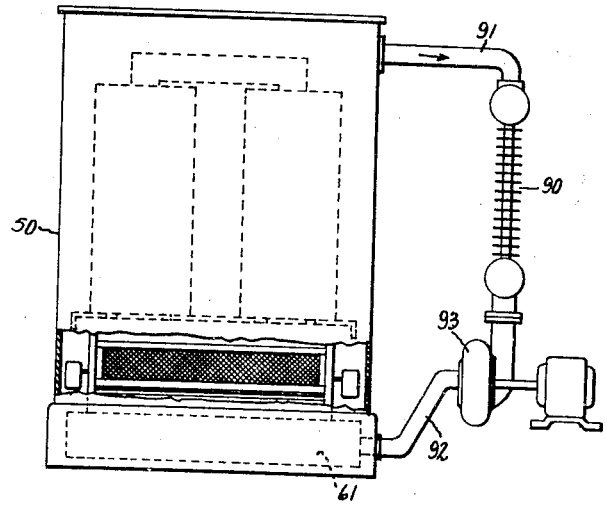
Figure 9:
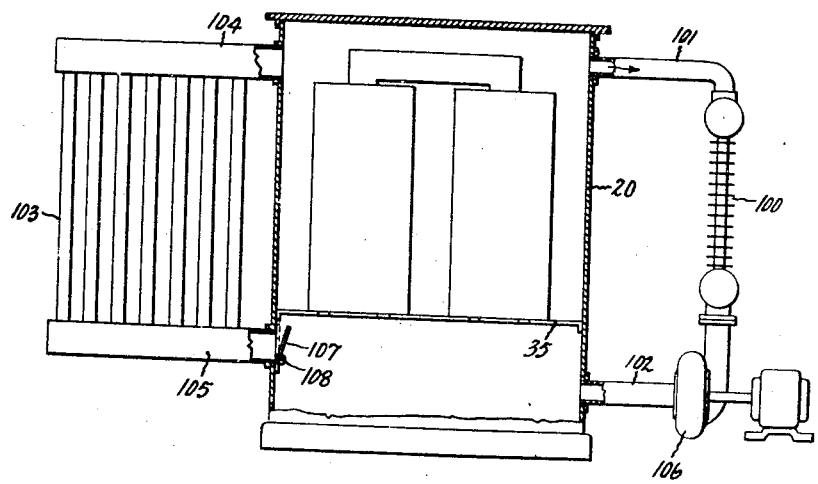

In the drawings Fig. 1 is a sectional side elevation partially diagrammatic of a transformer and fluid system therefor which is provided with an embodiment of my invention; Fig. 2 is a perspective view of a transformer and fluid system therefor illustrating a modification of the invention illustrated in Fig. 1; Fig. 3 is a side elevation in partial section illustrating in further detail the winding arrangement of Fig. 2; Fig. 4 is a perspective view partly in section illustrating the bottom of the enclosing tank of Figs. 2 and 3; Fig. 5 is a sectional side elevation of the damper control arrangement and bottom of the casing employed in the constructions of Figs. 2, 3, and 4; Fig. 6 is a perspective view of the damper control arrangement illustrated in Fig. 4; Fig. 7 is a fragmentary view of the channel construction of Fig. 5 without the cooperating damper construction of the winding construction; and Figs. 8 and 9 are modifications of the transformer and fluid system therefor of the construction illustrated in Fig. 2.

Referring to Fig. 1 of the drawing, I have illustrated a transformer and fluid system therefor including a tank 20 having a core winding leg 21. Windings such as the low voltage winding 22 and high voltage 23 surround the winding leg 21, and any suitable insulating fluid may be provided in the tank, such as mineral oil or a suitable chlorinated hydrocarbon, such as for example the liquid described in Clark Patent 1,931,373, issued October 17, 1933, and which is assigned to the same assignee as this present invention. A suitable winding duct 24 is provided between the high and low voltage windings, the winding duct having openings at opposite ends of the winding.

In order to provide for forced circulation of the insulating fluid through the transformer tank and winding duct I provide a pump 25 which is connected to the tank through a pipe 26, the pump being operated in any suitable manner such as by a motor 27. The pump exhausts into a header 28 of a suitable heat exchanger or first cooler 29. The cooler 29 is connected by a suitable piping arrangement 30 to a second cooler or heat exchanger 31 at one end such as the top end 32 of the heat exchanger 31. The opposite end 33 of the heat exchanger 31 is connected to the lower end of the casing 20 through a pipe 34.

In order to provide for a directed flow of the fluid in the casing, a diaphragm arrangement 35 is provided between the winding and the casing so that the fluid which is exhausted into the lower portion of the casing through the pipe 34 will pass through the winding ducts 24 rather than in the space between the outside of the winding and the side wall of the casing. Thus upon operation of the motor and pump the fluid will be withdrawn through the pipe 26 and pass through first heat exchanger 29 and second heater 31 and be exhausted through the pipe 34 into the lower end of the casing.

In order to provide for circulation of the dielectric fluid through the second heat exchanger 31 due to free convection in case the pump does not operate, I provide a connection between the top of the casing and the end 32 of the heat exchanger 31 by a pipe 36. The fluid may circulate due to natural convection up through the winding duct into the pipe 36 down to the heat exchanger 31 and back into the bottom of the casing through the pipe 34.

However in order to prevent circulation of the dielectric fluid between the top of the casing and the top of the heat exchanger 31 through the pipe 36 during the forced cooling, I provide a valve or damper arrangement 37 in the pipe 36, and the damper 37 may be controlled in any suitable manner so that it will be closed when the pump is operating and open when the pump is deenergized. In Fig. 1 I have illustrated an arrangement for operating the damper 37 which includes a control damper vane 38 which is operatively connected to the damper 37 through a rod 39. It will be seen that when the pump 25 is operating the force of the fluid will cause the control vane 38 to move to the dotted line position thus causing the damper 37 to close by moving to its dotted line position. However, upon cessation of the force fluid flow, by having the damper control vane 38 of a larger mass than the damper 37, the former will move by the force of gravity to its position as shown in Fig. 1, thus opening the damper 37 and closing the damper vane 38. Thus when in this position the fluid may flow through the winding duct, out through the pipe 36, down through the heat exchanger 31 and be exhausted into the lower end of the casing 20. Also, the damper vane 38 may be large enough to act as a damper, if desirable.

It will therefore be seen that when in the construction as illustrated in Fig. 1 the pump 25 is deenergized for any reason and it is still desired to operate the transformer, it will be cooled by having the oil flow by free convection through the winding duct and second cooler 31. In order, however, to make use of the relatively large body of fluid between the winding and casing more directly in cooling the transformer windings during free convection, a damper control construction may be provided in the barrier as is described and claimed in my above-mentioned application, or a modified damper control construction may be provided as I have shown in Figs. 2 to 6.

Referring therefore to Fig. 2, I have provided a transformer including a casing 50 which is connected to heat exchangers 29 and 31 of the same types as illustrated in Fig. 1. Thus as is also provided in Fig. 1, during operation of the pump 25 fluid may be withdrawn through the pipe 26 pass through the pump 25, heat exchangers 29 and 31 and be discharged into the bottom of the casing through the pipe 34. It will be understood that the heat exchangers 29 and 31 as shown in Fig. 2 are similar to those in Fig. 1, but are further removed from the casing in Fig. 2, so as to facilitate the illustration of the coil and damper construction within the casing 50 of Fig. 2. Also when the pump 25 is deenergized and the transformer is still operating, fluid may flow through the pipe 36 down through the heat exchanger 31 and be exhausted into the bottom of the casing 50 through pipe 34. A damper 37 and control damper 38 are provided in Fig. 2 for the same reasons as they are provided in Fig. 1.

Within the transformer tank 50 in Fig. 2 I have provided windings 51 and 52 which surround core winding legs 53 and 54, respectively. Winding ducts 55 and 56 are provided with openings at opposite ends of the winding. However, in place of the radially extending barrier 35 of Fig. 1 I provide a modified barrier arrangement in Fig. 2 which is illustrated more particularly in Fig. 3 and includes cylinders 57 and 58 which surround the windings 51 and 52 respectively. The lower ends of the transformer windings are enclosed by a box arrangement 59, made of any suitable material such as insulation. It will be understood therefore that the upper ends of the winding ducts exhaust into the top of the transformer casing 50 while the lower ends of the winding ducts communicate with the enclosure provided by the enclosing casing means 59.

In order to provide a convenient fluid communication between the pipe 34 and the lower ends of the winding ducts, the bottom 60 of the transformer casing is provided with a channel structure 61, as shown in Fig. 4. An upper surface 62 of the channel arrangement has an opening 63, and a lower surface including angle members 64 and 65 of the enclosing box 59, see Fig. 5, is provided with an opening 66 which is in registry with the opening 63.

In order to provide a communicating passage from the space between the winding and the outer wall of the casing 50 with the winding duct, I provide a port arrangement 67 which is in the side wall of the enclosing housing 59, as shown in Figs. 3 and 5. A damper or valve means 68 is pivotally mounted through a rod 69, the rod being movably mounted in a bearing 70, which is supported by a board 71, as is particularly shown in Fig. 6. It will be understood that a similar bearing and board are provided at the opposite end.

In order that the flow of fluid due to the forcing of the fluid by the pump 25 will keep the damper 68 in the position as illustrated in Fig. 5, I provide a panel 72 with an inwardly extending portion 73 so as to provide a restricted passage 74 between the panel 73 and the damper 68. The force of the fluid will therefore hold the damper 68 in the position as is illustrated in Fig. 5. In order to insure that the damper will move so as to open the port 67 I provide counterweights 75 on the shaft 69 so that upon cessation of the forcing of the fluid the damper will move to the dotted line position as shown in Fig. 5. Suitable stops 76 are provided for limiting the movement in this position. So as to prevent leakage of the fluid during the forcing thereof between the bottom of the damper and the L member 77, I provide a spring arrangement 78 which is attached to the L member 77 by means of suitable screws 79. As will be seen more particularly in Fig. 6 the spring arrangement is provided with a plurality of fingers which abut against the bottom of the damper which is curved around the rod 69 so as to prevent the flow of fluid through this space.

In the manufacture of the transformer structure as is illustrated in Fig. 2 the bottom channel 61 may be placed on the bottom of the transformer 60 in any suitable manner such as welding and the core and coils may be separately assembled. The core and coils with the box 59 and damper may then be lowered into the tank until the bottom surfaces of the angle member 64 and 65 abut against the cooperating surfaces 62 of the channel members. In order to insure that there will not be undue leakage through these abutting surfaces I provide a gasket in the form of spring members 80 and 81 which are attached to the vertical sides 82 and 83 of the channel member 61. When the core and coils are removed the spring members will be in a somwhat upwardly position as is shown in Figs. 4 and 7, and upon lowering the core and coils the spring members 80 and 81 will be forced between the abutting surfaces provided by the members 64 and 65 and 62.

It will be understood that the coil and damper construction of Fig. 2 may be used with any other suitable cooler arrangement such as a single forced cooler instead of the forced cooler arrangement 29 and the self-cooler arrangement 31 as shown in Fig. 2. I have therefore shown in Fig. 8 a casing 50 including the core and coils and damper of the construction shown and described above and which is connected to a cooler 90 by a pipe 91 which communicates with the top of the casing 50 and a pipe 92 which communicates through a pump 93 to the channel 61. The operation of this system will be apparent and the oil while the pump 93 is in operation will be withdrawn from the top of the casing, pass through the heat exchanger 90 and will be discharged into the channel 61. However, upon cessation of the forced cooling due to stoppage of the pump 93 the fluid in the space between the windings and the outside of the casing 50 may circulate through the port 67 and up through the winding duct.

In Fig. 9 I have illustrated a modification of the construction illustrated in Fig. 1 which includes a transformer tank 20 similar to that illustrated in Fig. 1. Instead of connecting the coolers in series they are connected in parallel to the tank and the forced cooler 100 is connected to the tank through the pipes 101 and 102 while the self-cooler 103 is connected to the top and bottom of the tank through the pipes 104 and 105. During operation of the pump 106 the oil will flow from the top of the transformer casing and be discharged into the bottom below the diaphragm 35 where the oil may pass up through the winding duct. In order to prevent the flow of fluid through the self-cooler 103 during the operation of the forced cooling I provide a suitable damper arrangement 107 which is pivoted at 108, and the force of the fluid being discharged into the bottom of the casing will hold the damper into its dotted line position as is illustrated in Fig. 9. However, upon cessation of the forced fluid flow due to the force of gravity the damper 107 will move downwardly thus opening the pipe 105 to communication with the bottom of the casing so that the fluid may move to natural convection up through the winding ducts into the top of the header of the cooler 103 and out through the bottom header 105 and into the bottom of the casing.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. In an electrical apparatus, an enclosing casing, a winding having a duct, said winding being spaced from the side walls of said casing, an insulating fluid in said casing, heat exchanger means having first and second parts connected to said casing to provide a recirculating system, pump means for forcing the insulating fluid through said casing and both parts of said heat exchanger means, means including barrier means between said winding and said casing for directing the flow of the fluid through said duct, pipe means for connecting said second part of said heat exchanger means with said casing, said barrier having port means for permitting the flow of the fluid by free convection through said duct then between said winding and said casing and through said port means so as to use the fluid between said winding and casing to cool said winding, means responsive to the forcing of the fluid flow through said duct for closing said port and to the cessation of the forcing of the fluid flow through said duct for opening said port, and valve means for substantially preventing the circulation of fluid flow between said casing and said second part of said heat exchanger means through said pipe means during operation of said pump, said valve means being openable upon cessation of fluid flow by said pump so as to allow fluid flow by free convection through said duct and said second heat exchanger means.

2. In an electrical apparatus, an enclosing casing, a winding having a duct, said winding being spaced from the side walls of said casing, an insulating fluid in said casing, heat exchanger means having first and second parts connected to said casing to provide a recirculating system, pump means for forcing the insulating fluid through said casing and heat exchanger means, means including barrier means between said winding and said casing for directing the flow of fluid through said duct, pipe means for connecting said second part of said heat exchanger means with said casing, said barrier having port means, damper means for closing said port means during operation of said pump, said damper means being automatically openable upon cessation of said pump, said damper means when open permitting the flow of the fluid by free convection through said duct then between said winding and said casing and through said port means so as to use the fluid between said winding and casing to cool said winding, and valve means for substantially preventing the circulation of fluid flow between said casing and said second heat exchanger means through said pipe means during operation of said pump, said valve means being openable upon cessation of fluid flow by said pump so as to allow fluid flow by free convection through said duct and said second heat exchanger means.

3. In an electrical apparatus, an enclosing casing, a winding having a duct with openings adjacent ends of said windings, insulating means enclosing one end of said winding and said opening adjacent said winding end, said winding and enclosing insulating means being spaced from the side walls of said casing, heat exchanger means connected to said casing and to said enclosing insulating means, pump means for forcing the insulating fluid through said duct and heat exchanger means, said enclosing insulating means having port means permitting the flow of the fluid by free convection through said duct then between said winding and said casing and through said port means so as to use a major portion of the fluid in said casing to cool said winding, and means responsive to the forcing of the fluid flow through said duct for closing said port and to the cessation of the forcing of the fluid flow through said duct for opening said port.

4. In an electrical apparatus, an enclosing casing, a winding having a duct with openings adjacent ends of said windings, insulating means enclosing one end of said winding and said opening adjacent said winding end, said winding and enclosing insulating means being spaced from the side walls of said casing, heat exchanger means connected to said casing and to said enclosing insulating means, pump means for forcing the insulating fluid through said duct and heat exchanger means, said enclosing insulating means having openable port means, and means responsive to the cessation of the forcing of the flow of fluid for opening said port means so as to allow the fluid to flow by convection up through the duct and down between said winding and said casing and through said port means.

5. In an electrical apparatus, an enclosing casing, a winding having a duct with openings adjacent ends of said windings, insulating means enclosing one end of said winding and said opening adjacent said winding end, said winding and enclosing insulating means being spaced from the side walls of said casing, heat exchanger means connected to said casing and to said enclosing insulating means, pump means for forcing the insulating fluid through said duct and heat exchanger means, said enclosing insulating means having port means, damper means in said port means, and damper control means operatively connected to said damper for closing said port means by the force of said circulating fluid during operation of said pump, said damper control means being movable to a position to allow opening of said damper means upon cessation of the forcing of the fluid.

6. In an electric induction apparatus, an enclosing casing, a winding having a duct with openings adjacent ends of said winding, insulating means enclosing one end of said winding and said opening adjacent said winding end, said winding and enclosing insulating means being spaced from the side walls of said casing, heat exchanger means, pipe means fluidly connecting one end of said heat exchanger means with said casing, means including means integral with said casing for connecting another end of said heat exchanger means with said enclosing insulating means, pump means for forcing the insulating fluid through said duct and heat exchanger means, said enclosing insulating means having port means, and damper means movable to close said port means during operation of said pump and movable to opening said port means upon cessation of the forcing of the fluid flow so that the fluid may flow due to free convection through said duct and between said winding and casing and through said port means.

7. In an electric induction apparatus, an enclosing casing, a winding having a duct with openings adjacent ends of said winding, insulating means enclosing one end of said winding and said opening adjacent said winding end, said winding and enclosing insulating means being spaced from the side walls of said casing, heat exchanger means, pipe means fluidly connecting one end of said heat exchanger means with said casing, channel means integral with the bottom of said casing, said channel means having an opening, means for connecting said channel means with said heat exchanger means, said enclosing insulating means having an opening in registry with said opening in said channel, said enclosing insulating means having port means connecting with the space between said winding and said casing, and damper means movable to close said port means of said enclosing insulating means during operation of said pump and movable to open said port means of said enclosing insulating means upon cessation of the forcing of said fluid.

8. In an electric induction apparatus, an enclosing casing, a core and winding structure removable as a unit from said casing, said winding having top and bottom ends interconnected by a winding duct, means enclosing the bottom end of said winding, said enclosing means being removable as a unit with said core and winding structure, an opening in the bottom of said enclosing means, channel means on the bottom of said casing and having a top opening in registry with the bottom opening in said enclosing means when said core and winding structure is lowered into said casing.

9. In an electric induction apparatus, an enclosing casing, a core and winding structure removable as a unit from said casing, said winding having a duct with openings at ends of said winding, means enclosing one end of said winding and the adjacent end of said duct, said enclosing means having a flat surface on the lower side thereof with an opening in said flat surface, channel means on the bottom of said casing with a flat surface on an upper side thereof with an opening in said flat surface, said openings being in registry and said flat surfaces being in substantially abutting relation when said core and winding is in said casing.

10. In an electric induction apparatus, an enclosing casing, a core and winding structure removable as a unit from said casing, said winding having a duct with openings at ends of said winding, means enclosing one end of said winding and the adjacent end of said duct, said enclosing means having a flat surface on the lower side thereof with an opening in said flat surface, channel means on the bottom of said casing with a flat surface on an upper side thereof with an opening in said flat surface, said openings being in registry and said flat surfaces being in substantially abutting relation when said core and winding is in said casing, and flexible gasket means between said relatively abutting flat surfaces.

11. Heat evolving electrical apparatus having an enclosing tank which is substantially full of an insulating and cooling liquid, two openings near the top of said tank and one opening near the bottom of said tank, a radiator having two top openings and one bottom opening, means for directly interconnecting said bottom openings, means including a check valve for interconnecting one opening near the top of said tank with one of the top openings of said radiator, said check valve permitting liquid to flow through it from said tank to said radiator and blocking reverse flow, a pump, a second radiator, means including a second check valve for serially connecting said pump and second radiator between the remaining top openings of the tank and the first radiator, said second check valve permitting liquid to flow through it into said first radiator and preventing reverse flow, and means for interlocking said check valves so that when each one is open the other one is closed.

12. Heat evolving electrical apparatus having an enclosing tank which is substantially full of an insulating and cooling liquid, two openings near the top of said tank and one opening near the bottom of said tank, a radiator having two top openings and one bottom opening, means for directly interconnecting said bottom openings, means including a check valve for interconnecting one opening near the top of said tank with one of the top openings of said radiator, said check valve permitting liquid to flow through it from said tank to said radiator and blocking reverse flow, a pump, a second radiator, means including a second check valve for serially connecting said pump and second radiator between the remaining top openings of the tank and the first radiator, said second check valve permitting liquid to flow through it into said first radiator and preventing reverse flow, means for interlocking said check valves so that when each one is open the other one is closed, said apparatus having a winding provided with a cooling duct, means in said tank between its bottom opening and said cooling duct for directing liquid from the bottom of said first radiator into said duct, and means responsive to the absence of fluid pressure produced by said pump for permitting said liquid to circulate in one direction in said tank between said apparatus and the walls of said tank and in the opposite direction through said duct.

KONSTANTIN K. PALUEV.

REFERENCES CITED

The following references are of record in the file of this patent:

UNITED STATES PATENTS

| Number | Name | Date |
| --- | --- | --- |
| 913,060 | Schaumberg | Feb. 23, 1909 |
| 1,083,945 | Randall | Jan. 13, 1914 |
| 1,706,574 | Hodtum | Mar. 26, 1929 |
| 1,798,702 | Roebel | Mar. 31, 1931 |
| 1,800,163 | Thompson | Apr. 7, 1931 |
| 1,835,470 | Clarke | Dec. 8, 1931 |
| 2,347,989 | Burnham | May 2, 1944 |

FOREIGN PATENTS

| Number | Country | Date |
| --- | --- | --- |
| 745,612 | France | May 13, 1933 |